(12) United States Patent
Hamner et al.

(10) Patent No.: US 7,176,272 B2
(45) Date of Patent: Feb. 13, 2007

(54) PRESSURE SENSITIVE MATERIAL

(75) Inventors: Marvine P. Hamner, Frederick, MD (US); Robert F Mulligan, Baltimore, MD (US)

(73) Assignee: Leatech, LLC, Frederick, MD (US)

( * ) Notice: Subject to any disclaimer, the term of this patent is extended or adjusted under 35 U.S.C. 154(b) by 0 days.

(21) Appl. No.: 10/290,739

(22) Filed: Nov. 8, 2002

(65) Prior Publication Data

US 2004/0091695 A1     May 13, 2004

(51) Int. Cl.
*C08G 18/30*     (2006.01)

(52) U.S. Cl. .......................................... 528/73; 528/85

(58) Field of Classification Search .................. 528/73, 528/85
See application file for complete search history.

(56) References Cited

U.S. PATENT DOCUMENTS

| | | | |
|---|---|---|---|
| 5,142,155 A | 8/1992 | Mauze et al. ............. | 250/458.1 |
| 5,307,675 A | 5/1994 | Mosharov et al. ............. | 73/147 |
| 5,341,676 A | 8/1994 | Gouterman et al. .......... | 73/147 |
| 5,359,887 A | 11/1994 | Schwab ........................ | 73/147 |
| 5,498,549 A | 3/1996 | Nagel et al. ................. | 436/172 |
| 5,814,833 A | 9/1998 | Jenekhe ........................ | 257/40 |
| 5,854,682 A | 12/1998 | Gu ............................... | 356/426 |
| 5,965,642 A | 10/1999 | Gouterman et al. .......... | 524/88 |

FOREIGN PATENT DOCUMENTS

| | | |
|---|---|---|
| GB | 2272514 | 5/1994 |
| WO | 9212424 | 7/1992 |
| WO | 97/47966 | * 12/1997 |
| WO | 9957222 | 11/1999 |
| WO | 0146121 | 6/2001 |

OTHER PUBLICATIONS

Szycher; Handbook of Polyurethanes;1999; pp. 18-1-18-6, 20-4.*
Yang et al; Fluorescence energy transfer studies in a cross-linked polyurethane network; Can. J. Chem.; 1995; 1823-1830.*
Iida et al; Cyclocondensation of Oxalyl Chloride with 1,2 gycols; Tetrahedron; vol. 49; No. 46; 1993; 10511-10530.*
Hamatani, H., "Intermolecular Exciplex of Pyrene/N,N-Dimethylaniline in Supercritical Carbon Dioxide", J. Phys. Chem., vol. 97 (1993) pp. 6332-6333.

* cited by examiner

*Primary Examiner*—Rachel Gorr
(74) *Attorney, Agent, or Firm*—Venable LLP; Keith G. Haddaway

(57) ABSTRACT

A polymeric material which exhibits an optically detectable response to changes in pressure. The material includes an elastomer selected from the group of a polyurethane, a polyacrylate, and a silicone, in combination with a photochemical system. The photochemical system may be in the form of an exciplex or a fluorescence resonance energy transfer. Both photochemical systems are reversible processes. Synthesis of the elastomer and the photochemical system produce a material which forms an excited charge transfer complex when subject to an increase in pressure and a less excited charge transfer complex as pressure is lowered.

15 Claims, 6 Drawing Sheets

PRESSURE SENSITIVE MATERIAL

BACKGROUND OF THE INVENTION

1. Technical Field

This invention relates to polymeric material useful in acquiring quantitative surface pressure measurements. More specifically, the invention relates to synthesis of a nano-material which exhibits an optically detectable response to changes in pressure.

2. Description of the Prior Art

Acquisition of global, surface pressure data by optical non-intrusive methods has been sought after for many years. Techniques used for the acquisition of these data range from detection of Raman scattering to materials commonly called pressure sensitive paints. Traditionally, pressure sensitive paints consist of a host matrix in which one of a variety of chromophores is encapsulated. The host matrix is often a polymeric material such as polydimethylsiloxane (PDMS), but other materials such as sol-gels have been used. Typical chromophores used have included platinum octaethylporphyrin (PtOEP) and ruthenium-based complexes. The functionality of these pressure sensitive paints depends on the dynamic quenching of the chromophore's luminescent emission by oxygen. In order for this dynamic quenching to be effective the host matrix must allow the diffusion of oxygen throughout the "paint" to the chromophores. One example of a prior art application requiring the diffusion of oxygen is U.S. Pat. No. 5,965,632 to Gouterman which teaches the use of a pressure sensitive pain incorporating an acrylic and flouroarcrylic polymer binder. A pressure sensing dye is dissolved or dispersed in the polymer matrix. The dyes illuminate in the presence of molecular oxygen. Similarly, in a prior non-related application to Kelley et al., the pressure sensitive material used has a host polymer and a fluorescent compound attached to the host polymer. The host polymer has a "rubber like" characteristic rather than a rubbery elastomer. In addition, Kelley et al. focuses on the use of polystyrene in place of a polyurethane and rubberized polymethacrylate because it does not contain oxygen. Accordingly, one of the limitation of the prior art pressure sensitive paints is the sensitivity to oxygen.

Dynamic quenching by oxygen follows an association known as the Stern-Volmer relationship. This relationship between changes in luminescent emission intensity, I, and the local partial pressure of oxygen, $p_o$, is expressed as $I_o/I = A + B(p/p_o)$ where $A = k_d/(k_a + k_q p_o)$ and $B = k_q p_o/(k_a + k_q p_o)$. In these equations $I_o$ is the incident excitation light intensity, $k_a$ is the intrinsic de-excitation rate in the absence of oxygen, $k_q$ is the quenching rate due to collisions with oxygen and p is the local pressure. In addition, A+B=1. A typical plot of the relationship between changes in luminescent emission intensity and local partial pressure of oxygen is shown in FIG. 1. Under the conditions normally experienced during high-speed tests (e.g. supersonic), systems following the Stern-Volmer relationship exhibit relatively large changes in emission intensity for only small changes in pressure. However, the same systems used for low-speed (e.g. atmospheric) tests exhibit only extremely small changes in emission intensity even for large changes in pressure. This is shown schematically in FIG. 2 which is a graph showing the Stern-Volmer relationship between small changes in intensity and large changes in pressure. In addition, systems following the Stern-Volmer relationship exhibit decreasing emission intensity with increasing pressure. Accordingly, this results in lower signal to noise ratios with the maximum signal to noise ratio at vacuum, or near vacuum, conditions.

Because these systems rely on oxygen quenching to vary emission light intensity with changes in pressure, any perturbation to the host matrix' oxygen permeability alters the pressure sensitive paint's performance. For example, variations in humidity and/or temperature affect pressure sensitive paint's performance. Unfortunately, even the oils normally found on human skin have been known to affect the performance of some traditional pressure sensitive paint formulations making handling of painted test articles difficult. Accordingly, there is a need for a pressure sensitive material that mitigates sensitivity to oxygen.

SUMMARY OF THE INVENTION

This invention comprises a nano-material adapted to exhibit an optically detectable response to changes in pressure.

In a first aspect of the invention a polymeric material for sensing pressure is provided. The material includes a polyurethane elastomer-selected from the group of an aliphatic diisocyanate, a hydroxl terminated polyol, and a photochemical system modified to be a chain extending diol. In addition, the material includes an isocyanate to hydroxyl molar ratio ranging from about 1 to 2 and a molar ratio of the diol mix ranging from about 10:1 to about 1:2. The photochemical system may be an exciplex or a fluorescence resonance energy transfer (FRET). The aliphatic diisocyanate may be in the form of isophorone diisocyanate and diisocyanato hexamethylene. The hydroxyl terminated polyol may be in the form of polypropylene glycol or polytetramethylene glycol. The polyurethane elastomer is preferably adapted to form an excited charge transfer complex when it is subject to an increase in pressure and a less excited charge transfer complex as pressure is lowered. The excited charge transfer preferably provides an optically detectable luminescent emission in response to a change in pressure. The polyurethane elastomer may include probes in the chain to measure deformation when subject to pressure. The probes preferably report movement in the chain through changes in spectral emission. In a further embodiment, the polyurethane elastomer may be formulated into a solution to be applied to a secondary surface, wherein the elastomer comprises from 3% to about 10% by weight of the solution. The solutions preferably enable application of the material to a secondary surface through a spraying apparatus.

In a second aspect of the invention, a polymeric material in the form of an elastomer selected from the group of a polyacrylate and a solicone, in combination with a photochemical system is used for sensing pressure. The polyacrylate elastomer is selected from the group consisting of a butyl acrylate, and a methyl methacrylate. A percentage of the butyl acrylate, methyl methacrylate, and silicon weight preferably ranges from about 20% to about 90%, and the photochemical system includes a dye molecule range from about 1 milligram to about 100 milligrams dye per 10 grams of polymer. The photochemical system is preferably an exciplex or a fluorescence resonance energy transfer. The exciplex molecule combination may include anthracene and dimethylaniline, perylene and dimethylaniline, or pryene and perylene. The FRET donor-acceptor system is preferably Fluorescein donor and Rhodamine acceptor. The polyacrylate elastomer preferably comprises from about 3% to about 10% by weight of the solution. The solution may include solvents such as ethanol, methanol, isopropanol, methyl ethyl ketone, acetone and/or toluene. The purpose of the solvents is to preferably control properties such as evaporation rate, coating thickness, coating quality, and spectral response. The solution may be applied to a secondary surface through a spraying apparatus.

Other features and advantages of this invention will become apparent from the following detailed description of the presently preferred embodiment of the invention, taken in conjunction with the accompanying drawings.

DESCRIPTION OF THE PREFERRED EMBODIMENT

Overview

The primary embodiment of this invention concerns the design, synthesis, and assembly of macromolecules on the nanoscale level. Fluorescent distance probing molecules are copolymerized onto polymer chains during polymer synthesis. The choice of probes, ratio of probes, concentration of the polymer, placement along the polymer chain, and the types of solvents used are parameters that are integral to performance of the material. The distance probes are used in this invention to measure the nano-deformation of a polymeric material as it is placed under load (pressure). As the material compresses or expands on the macro-scale, the polymer chains reorganize themselves in response to the load and the probes report the movement. Accordingly, the movement is reported and detected by the changing emission spectrum of the polymer.

Technical Details

1. Photochemical System

Figure 1:
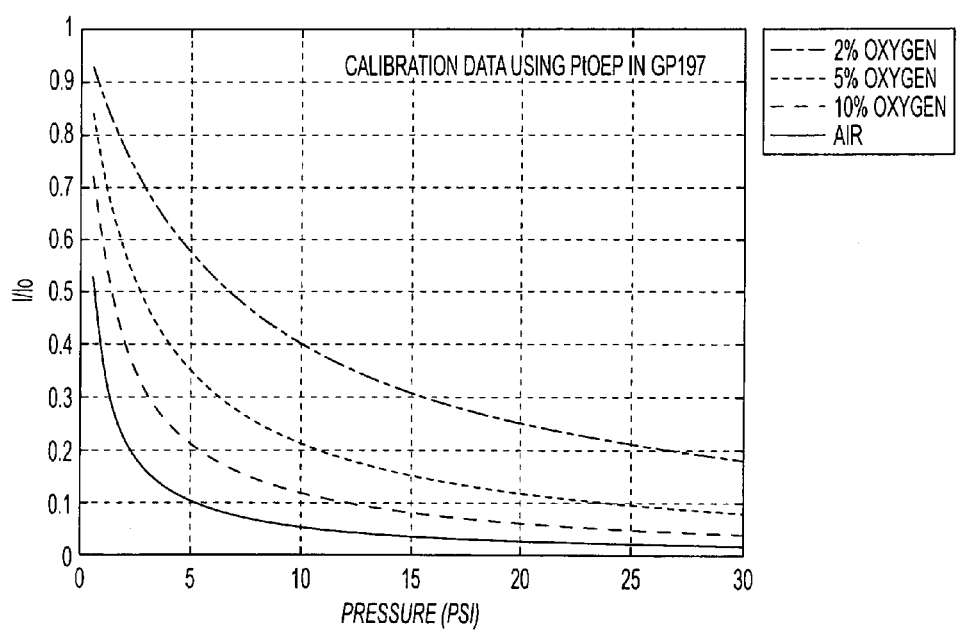
FIG. 1 is a prior art graph illustrating the relationship between changes in luminescent emission intensity and local partial pressure of oxygen.
Figure 2:
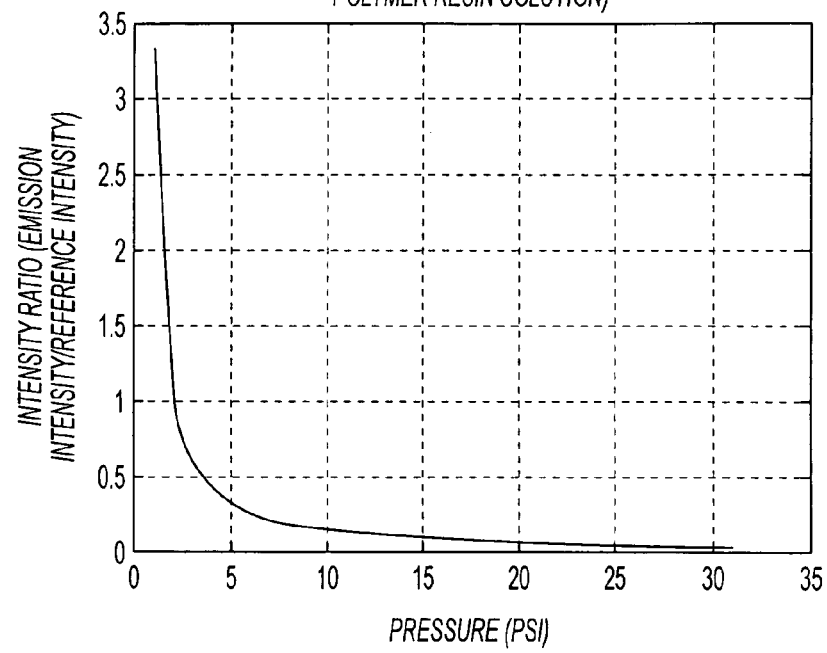
FIG. 2 is a prior art graph illustrating the Stern-Volmer relationship between small changes in intensity and large changes in pressure.
Figure 3:
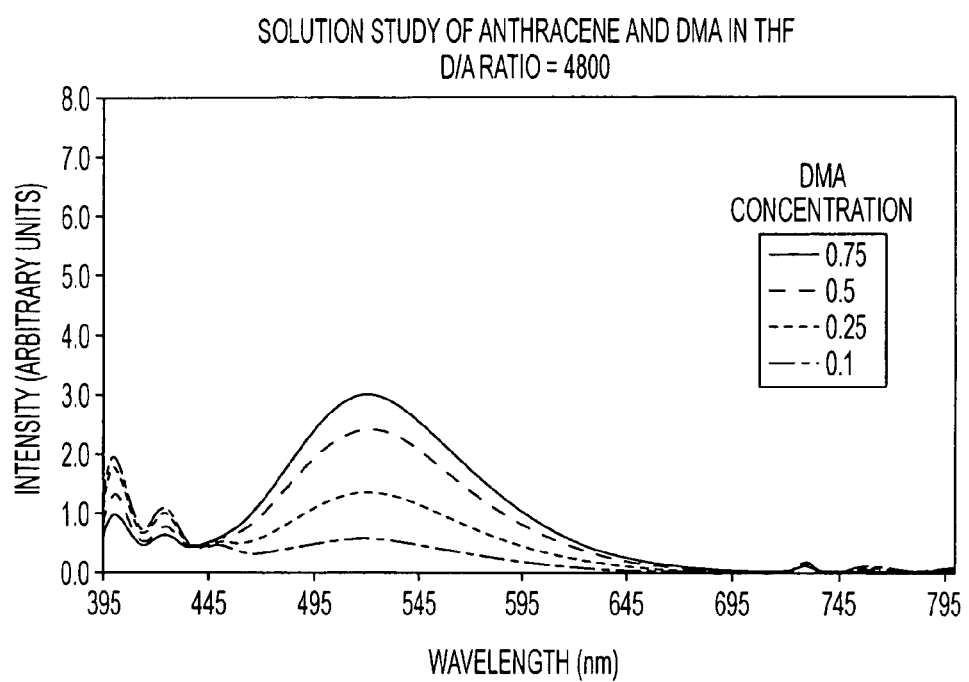
FIG. 3 is a graph illustrating of a typical spectral response of an exciplex forming system.
Figure 4:
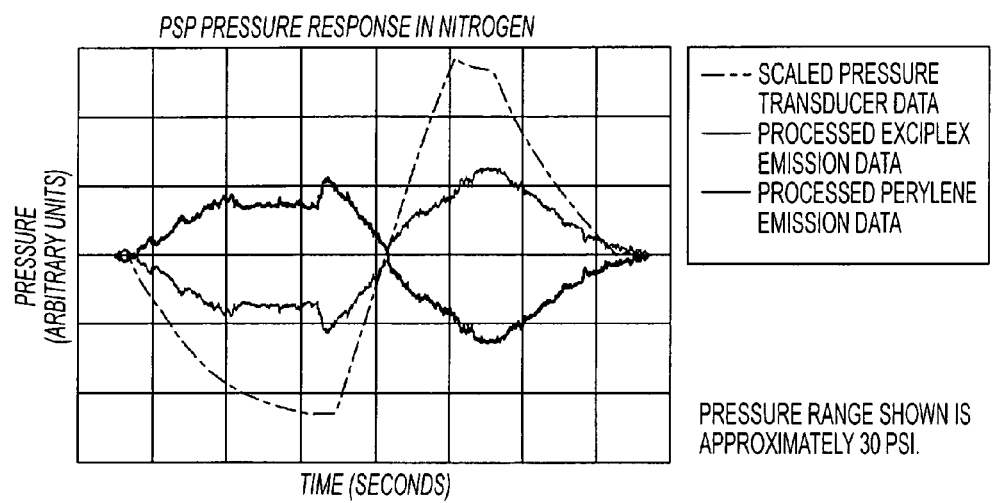
FIG. 4 is a graph illustrating the change in spectral response with changes in pressure.
Figure 5:
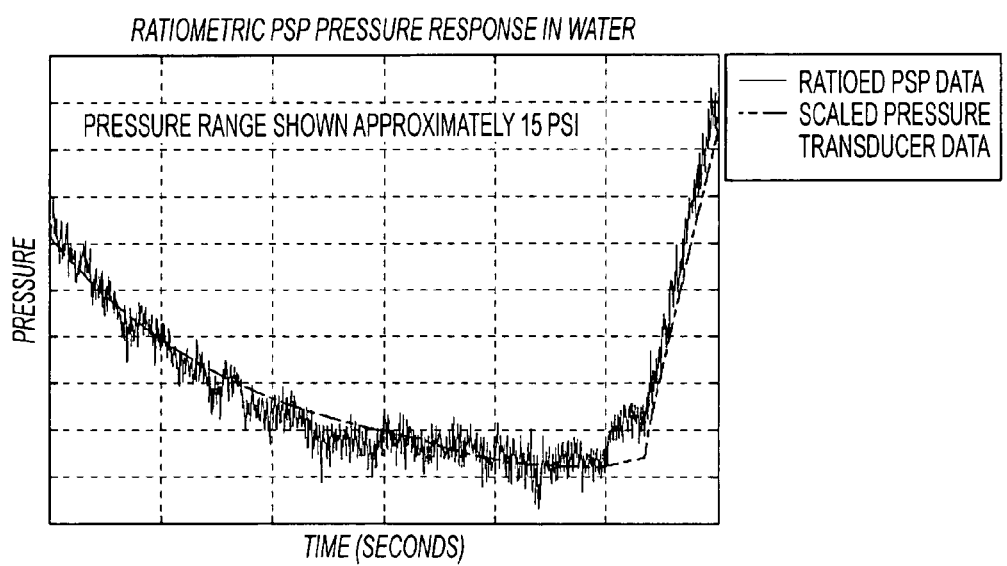
FIG. 5 is a prior art graph illustrating a ratiometric pressure sensitive paint response to changes in pressure.

The are two forms of a photochemical systems used in this invention, an excited state complex (exciplex) and fluorescence resonance energy transfer (FRET). Both photochemical systems are reversible. An exciplex (excited state complex) is the result of the formation of a charge transfer complex between an excited state fluorophore and a quencher. FIG. 3 is a graphic illustration of a typical spectral response of an exciplex forming system. In exciplex formation, an excited state fluorophore such as anthracene or perylene is quenched by an aliphatic or aromatic amine (e.g. dimethylaniline). FIG. 4 is a graphic illustration of perylene emission data and exciplex emission data. The excited state fluorophore accepts an electron from the donating amine, and fluorescence from the exciplex is observed as a broad featureless peak red shifted from the fluorophore. Accordingly, the exciplex has a fluorescence emission spectrum unique from the donor or acceptor.

The exciplex formation process is distance dependent. A critical intermolecular acceptor to donor distance (~2 Å) must be reached for emission of the complex to take place. The process is concentration dependent in solution, as well as in a solid matrix. Accordingly, donor concentrations, acceptor concentrations, and the acceptor to donor ratios are parameters that influence the emission spectra.

Figure 6:
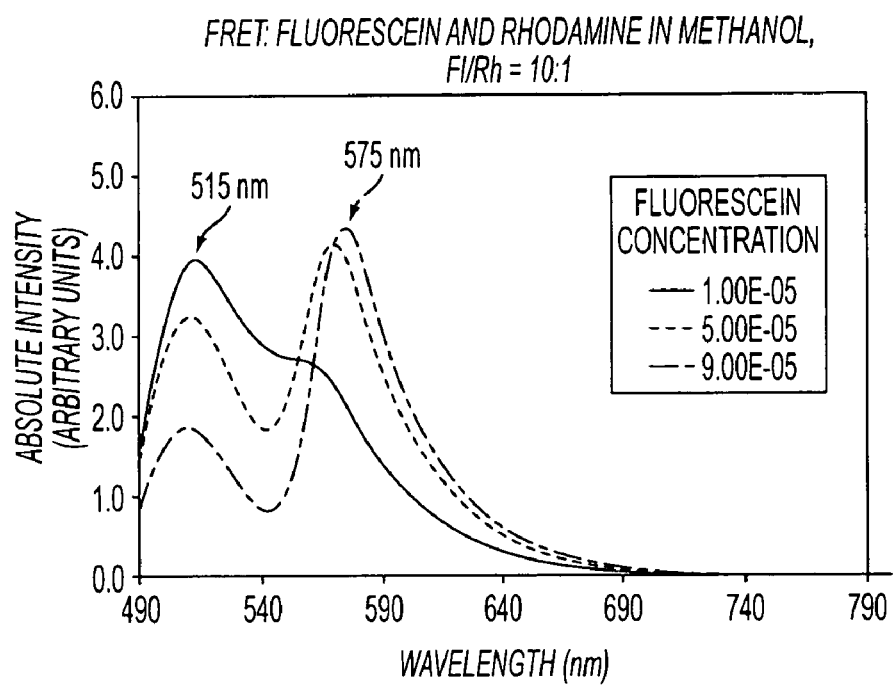
FIG. 6 is graph illustrating a FRET emission spectra according to the preferred embodiment of this invention, and is suggested for printing on the first page of the issued patent.

FRET is an alternative distance dependent system from the exciplex. In FRET, transfer of excited state energy takes place from an initially excited donor (D) to an acceptor (A). The donor and acceptor designation refers to energy, as opposed to the exciplex system in which the nomenclature refers to electrons. It is required that the absorption spectrum of the acceptor must overlap the fluorescence emission spectrum of the donor for FRET to occur. The intermolecular distances required for FRET are in the order of 20 to 60 Å, which is advantageous for probing movements of macromolecules. The energy transfer in FRET takes place without the emission and reabsorption of photons, and is solely the result of dipole-dipole interactions between donors and acceptors. One of the most common donor-acceptor systems in FRET is Fluorescein (Fl, donor) and Rhodamine B (Rh, acceptor). An example of the FRET emission spectra is shown in FIG. 6.

The Fluorescein and Rhodamine B system has potential as a distance dependent energy transfer system for pressure sensitive paint. The excitation wavelength that is commonly used in the Fluorescein and Rhodamine B system is 470 nm, which is compatible with existing pressure sensitive paint systems. The emission wavelengths of Fluorescein and Rhodamine B are far enough apart so that they can be optically isolated during signal detection. In FRET, the concentrations of constituent molecules are much less than what is required in the exciplex system. During material design the luminophores can be copolymerized in low weight percentages so as to not adversely alter the material properties. Accordingly, the FRET has some additional material properties advantages over the exciplex.

2. Materials

The luminescent pressure sensor described herein is a coating based on polymers such as polyurethanes, polyacrylates, and silicone. Specialty monomers which are specific to the exciplex or FRET systems are copolymerized with the coating during polymer synthesis. The materials chosen for this invention are elastomeric, meaning that they possess rubber-like properties and are capable of experiencing large and reversible elastic deformations. Accordingly, the elastomeric properties of the material in combination with the reversible photochemical process form an excited charge transfer complex or FRET when the material is subject to an increase in pressure and a less excited charge transfer complex or FRET as pressure is lowered.

Having the fluorescent monomers directly attached to the elastomer chains in this invention have the following significant advantages: 1) no dyes are lost during sensor use due to vaporization, sublimation, or migration to the environment, 2) aggregation of the dyes are prevented, and 3) the material properties together with the donor-acceptor ratio determine the sensitivity to pressure, and response of the luminescent pressure sensor.

The composition of the polyurethane elastomer for pressure sensitive coatings include, but are not limited to an aliphatic diisocyanate such as isophorone diisocyanate (IPDI) or diisocyanatohexamethylene (HDI), a hydroxyl terminated polyol such as polypropylene glycol (PPG) or polytetramethylene glycol (PTMO or PTMEG), exciplex or FRET participating molecules modified to be a chain extending diols. Another chain extender such as butane diol may be part of the polyurethane composition. Properties of the urethane coating (i.e. modulus, adhesion, solution viscosity, etc.) can be modified by adjusting the component type, their amount, and their weight ratios in the polymer synthesis.

In the present invention, the total isocyanate to hydroxyl molar ratio (NCO:OH) ranges from 1 to 2. Ratio values close to 1 produce linear elastomers, and values approaching 2 results in prepolymers capable of moisture curing into crosslinked coatings. The molar ratio of the diol mix (chain extender to polyol) can range from 10:1 to 1:2 in this invention.

The composition of the polyacrylates for pressure sensitive coatings include, but are not limited to, butyl acrylate (BA), methyl methacrylate (MMA), and exciplex or FRET participating molecules modified for acrylate polymerization. The physical properties of the polyacrylate coating can be tailored by adjusting the weight ratio of butyl acrylate to methyl methacrylate or exciplex in the polymer synthesis. Typical butyl acrylate weight percents of butyl acrylate in this invention range from 20% to 90%. The remaining weight fraction may be made up of methyl methacrylate or exciplex forming acrylate monomer. In a polyacrylate composition using the FRET in place of the exciplex, only a minute amount of FRET forming acrylate dye is needed in the acrylate synthesis (on the order of 1 milligram to about 100 milligrams of dye per 10 grams polymer).

The composition of the silicones for pressure sensitive coatings include, but are not limited to, GE silicone TSE-399c and a high viscosity silicon sealant, and exciplex or FRET participating molecules modified for silicon polymerization. The physical properties of the silicone coating can be tailored by adjusting the weight ratio of the silicones and the photochemical system.

EXAMPLES

Polyurethane Pressure Sensitive Material Example Synthesis:

A monomer mix of PPG (molecular weight: 2000 grams/mole; 8 grams, 0.004 moles) and dimethylaniline diol (DMAD) (molecular weight: 209.29 grams/mole; 1.672 grams, 0.008 moles) was added to a 125 ml 3 neck flask with 40 uL of dibutyl tin dilaurate (DBTDL) as catalyst. The flask was fitted with a condenser, an inlet for dry nitrogen, and an addition funnel. The flask was immersed in an oil bath and the contents were placed under a blanket of dry nitrogen. Anhydrous tetrahydrofuran (THF, 20 mL) was added through the addition funnel, and the flask was slowly heated to 70° C. At a reaction temperature of 70° C., isophorone diisocyanate (IPDI) (molecular weight: 222.29 grams/mole; 2.67 g, 0.0012 moles) and 5 mL of anyhrdrous tetrahydrofuran (THF) were added slowly through the addition funnel. The reaction mix was stirred for a total of 5 hours then cooled. The solid elastomeric product weighed approximately 12 grams and was obtained by removing the solvent under reduced pressure.

Polyacrylate Pressure Sensitive Material Example Synthesis:

A monomer mix of butyl acrylate (BA) and methyl methacrylate (MMA) in 70:30 weight ratio (7 grams BA, 3 grams MMA) was placed in a 3 neck 125 mL flask along with dibenzoyl peroxide (BPO, 0.5% by weight, 50 milligrams), Rhodamine B acrylate monomer (0.8 milligrams), and 38 mL of ethanol. The flask was fitted with a condenser and dry nitrogen inlet then placed in an oil bath. The reaction contents were slowly heated to 90° C. and the temperature was maintained for the course of the reaction. Total reaction time was 48 hours. The solid elastomeric product weighed approximately 10 grams and was obtained by removing the solvent under reduced pressure.

3. Materials Processing

Pressure sensitive materials based on polyurethanes in the present invention are formulated into solutions capable of being sprayed. The reaction mixture is diluted to a solution with a solid content of 3% to 10% (weight/volume) using solvents including tetrahydrofuran, toluene, isopropanol, methanol, and methyl ethyl ketone. The solution may include some or all of the above listed solvents in various ratios in the formulation to control the evaporation rate, coating thickness, and coating quality. The formulation may include the addition of plasticizer to control the coating properties and sensor response.

The formulation of acrylate or silicon based pressure sensitive materials in this invention are similar to the polyurethanes. Reaction mixtures are diluted to a solid content of 5% to 10% (weight/volume) using solvents including ethanol, isopropanol, methyl ethyl ketone, acetone, and toluene. The invention may include some or all of the above listed solvents (in various ratios in the formulation) to control the evaporation rate and coating qualities. In addition, the formulations in this invention can be sprayed using conventional air powered spraying equipment in the range of 15 to 40 psi.

Advantages Over the Prior Art

The prior art material with respect to Gouterman exploits the photochemical process of dynamic quenching by oxygen to vary the emission light intensity with changes in pressure. The reliance upon the oxygen component contributes to the sensitivity of the material. The prior art material with respect to Kelley et al. exploits photochemical systems and focuses on the use of these systems exclusively in polystyrene, which limits the useful range of application. By using the material disclosed herein, Applicant has overcome the limitation associated with polystyrene without incurring a penalty associated with oxygen. In the preferred embodiment of the invention, photochemical systems, i.e. exciplex or fluorescence resonance energy transfer (FRET), are exploited to remove the reliance on oxygen for pressure sensitivity. Both the exciplex and FRET systems provide a rapid response to changes in pressure. In addition, the compressibility of the material with the exciplex and FRET system is reversible. Accordingly, the removal of the reliance on oxygen as a contributor to detecting changes in pressure provides an improved response time as well as enhances sensitivity in application of the material.

Alternative Embodiments

It will be appreciated that, although specific embodiments of the invention have been described herein for purposes of illustration, various modifications may be made without departing from the spirit and scope of the invention. In particular, other types of distance dependent photochemical systems or materials used as host matrices or components of host matrices may be implemented into the pressure sensitive material. Accordingly, the scope of protection of this invention is limited only by the following claims and their equivalents.

We claim:

1. A polymeric material comprising:
   a polyurethane elastomer adapted to detect a change in load comprising an aliphatic diisocyanate, a hydroxyl terminated polyol, and a photochemical system including fluorescent distance probing molecules modified to be chain extending diols;
   wherein an isocyanate to hydroxyl molar ratio ranges from about 1 to 2; and
   the molar ratio of said chain extending diols to polyol ranges from about 10:1 to about 1:2.

2. The polymeric material of claim 1, wherein said photochemical system is selected from the group consisting of: an exciplex and a fluorescence resonance energy transfer (FRET).

3. The polymeric material of claim 1, the material having an optically detectable response to a change in load.

4. The polymeric material of claim 1, wherein said aliphatic diisocyanate is selected from the group consisting of: isophorone diisocyanate (IPDI) and diisocyanate hexamethylene (HDI).

5. The polymeric material of claim 1, where said hydroxyl terminated polyol is selected from the group consisting of: polypropylene glycol (PPG) and polytetramethylene glycol (PTMO or PTMEG).

6. The polymeric material of claim 1, further comprising an excited charge transfer complex formed from said polyurethane elastomer when subject to an increase in a load and a less excited charge transfer complex as said load is lowered.

7. The polymeric material of claim 6, wherein said excited charge transfer is adapted to provide a luminescent emission.

8. The polymeric material of claim 1, further comprising probes in said polyurethane elastomer chain adapted to measure deformation when subject to a load.

9. The polymeric material of claim 8, wherein said probes report movement in said polymer chain through changes in spectral emission.

10. The polymeric material of claim 1, wherein said polyurethane elastomer is adapted to be formulated into a solution for application to a secondary surface, wherein said elastomer comprises from about 3% to about 10% by weight of said solution.

11. The polymeric material of claim 10, wherein said solution includes a solvent selected from the group consisting of: tetrahydrofuran, toluene, isopropanol, methanol, and methyl ethyl ketone.

12. The polymeric material of claim 10, wherein said solution further comprises a plasticizer adapted to control coating properties and sensor response.

13. The polymeric material of claim 10, wherein said solution is adapted to be applied to a secondary surface through an air powered spraying apparatus adapted to apply said solution under pressure ranging from about 15 psi to about 40 psi.

14. The polymeric material of claim 2, wherein said exciplex molecule combination is selected from the group consisting of: anthracene and dimethylaniline, perylene and dimethylaniline, and pyrene and perylene.

15. The polymeric material of claim 3, wherein said optically detectable response to a change in load is selected from a group consisting of: global and local.

* * * * *